United States Patent [19]

Gray

[11] 4,331,179

[45] May 25, 1982

[54] REGULATOR/VALVE CONTROLLER

[75] Inventor: Tommy L. Gray, Dallas, Tex.

[73] Assignee: Span Instruments, Inc., Plano, Tex.

[21] Appl. No.: 204,338

[22] Filed: Nov. 5, 1980

[51] Int. Cl.³ .......................................... G05D 16/10
[52] U.S. Cl. ............................... 137/627.5; 137/85;
 137/596.18; 251/63.4
[58] Field of Search ............... 137/85, 627.5, 596.18;
 91/401; 251/63.4, 63.5, 63.6

[56] References Cited

U.S. PATENT DOCUMENTS

| | | | |
|---|---|---|---|
| 2,756,724 | 7/1956 | Stewart . | |
| 3,584,652 | 6/1971 | Huntington | 137/627.5 |
| 3,621,871 | 11/1971 | Fisher . | |
| 3,770,019 | 11/1973 | Stelzer | 137/627.5 |
| 3,944,294 | 3/1976 | Masuda | 137/627.5 X |
| 4,106,510 | 8/1978 | Hakim . | |

*Primary Examiner*—Robert G. Nilson
*Attorney, Agent, or Firm*—Richards, Harris & Medlock

[57] ABSTRACT

A valve (10) is interconnected in a flow line to control the downstream pressure by means of a relatively low pressure control device such as a block and bleed valve coupled to a control port (28). An activating piston (54) is moveable within a piston chamber (32) for activating a ball valve (44) to interconnect an outlet port (22) with an inlet port (20). In a manual reset mode, a pressurized fluid at a reset port (26) enters a regulator chamber (38). From the regulator chamber (38), the fluid flows through a passage between an annulus (42) and an extension tube (62) into the piston chamber (32) and acts against the activating piston (54). As fluid enters the piston chamber (32), the pressure acting against the activating piston (54) increases and moves the piston upward to activate the ball valve (44). A sealing surface (90) on a regulator piston (86) in the regulator chamber (38) prevents flow between the regulator chamber and the piston chamber (32) if the activating piston (54) moves upward to a position activating the ball valve (44), thereby limiting the pressure acting on the activating piston. A spring (64) urges the activating piston downward, deactivating ball valve (44) when the control port (28) is open for fluid flow. In the automatic mode, the inlet port (20) and the reset port (26) are interconnected so that a continuous predetermined pressure will exist in the regulator chamber (38) and the valve (10) will be automatically reset.

12 Claims, 2 Drawing Figures

REGULATOR/VALVE CONTROLLER

TECHNICAL FIELD

This invention relates to a control valve, and in particular, to a valve for controlling pressure downstream by the use of a valve responsive to a relatively low regulated control pressure.

BACKGROUND ART

In many fluid systems, such as a hydraulic or air operated system, it is often necessary to provide a control valve for shutting off and/or exhausting flow downstream of the valve or for regulating the fluid pressure to a device downstream of the valve. A downstream device, such as a valve actuator, is thus controlled by the upstream valve.

In particular, it is often necessary in a fluid system to provide a valve controlling downstream flow which, in turn, is operated by a control device sensing a downstream condition, such as a pressure or other relevant condition. As an example, a condition monitoring device includes a block and bleed valve wherein flow through the block and bleed valve is resisted until a predetermined condition is encountered in the downstream flow. When this condition is present, the block and bleed valve opens to allow fluid flow therethrough. This flow is then used to actuate a control valve to shut off or regulate the downstream flow.

Typically, the block and bleed valve in a condition monitoring device is connected to the control valve to permit flow at either a preselected maximum or minimum fluid pressure in the downstream flow. In another type system, two block and bleed valves are used to control fluid flow outside a preselected range of fluid pressure. By way of example, block and bleed valves are controlled by a Bourdon tube monitoring a pressure or by a solenoid operated by a time controller. That is, a timer periodically operates the block and bleed valve to shut down or reset the control valve.

DISCLOSURE OF THE INVENTION

In accordance with the present invention, a valve for controlling downstream pressure is provided.

In one embodiment, the valve includes a valve body having a piston chamber therein and defining an inlet port, an outlet port, an exhaust port and a control port, each communicating with the piston chamber. An activating piston is positioned within the piston chamber and is movable therein between first and second positions between the ends of the chamber. A spring biases the activating piston toward one end of the piston chamber. A ball valve is positioned at the opposite end of the piston chamber and is actuated by the activating piston when the piston moves toward the ball valve end of the chamber. Actuation of the ball valve interconnects the inlet and outlet ports.

To induce movement in the activating piston toward the ball valve end of the chamber, a fluid regulator controls pressurized fluid into the piston chamber to act against a first surface on the activating piston. The regulator limits the pressure acting against the first surface with excess pressure being exhausted through the exhaust port. The ball valve is deactivated to shut off fluid flow from the inlet port to the outlet port when fluid flows from the piston chamber through the control port to reduce the pressure acting against the first surface of the activating piston.

An advantage of the invention is that it permits the control of a relatively high pressure operating fluid between the inlet and outlet ports by a relatively low pressure fluid acting against the first surface of the piston.

In accordance with another aspect of the present invention, the regulator includes a regulator piston movable in a regulator chamber within the valve body. A spring urges the regulator piston towards an annulus interconnecting the regulator chamber and piston chamber. An extension tube is formed on the activating piston. The exposed end of the extension tube is normally in contact with a seal surface on the regulator piston so that the activating piston and regulator piston move together in unison. Fluid pressure flows from the regulator chamber through the passage between the annulus and extension tube into the piston chamber. As the activating piston moves upward, the seal surface of the regulator piston moves into sealing engagement with the valve body to limit the pressure within the piston chamber acting against the first surface. Should this predetermined pressure limit be exceeded, the extension tube of the activating piston will move out of engagement with the seal surface on the regulator piston and permit flow from the piston chamber to be exhausted through the exhaust port.

Another advantage of the present invention is the limiting of a control pressure in the regulator chamber to a predetermined limit for use with a sensing device, such as a block and bleed valve. Still another feature of the present invention is the self cleaning operation of the regulator, that is the self cleaning of the passage formed by the annulus and extension tube between the piston chamber and the regulator chamber.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
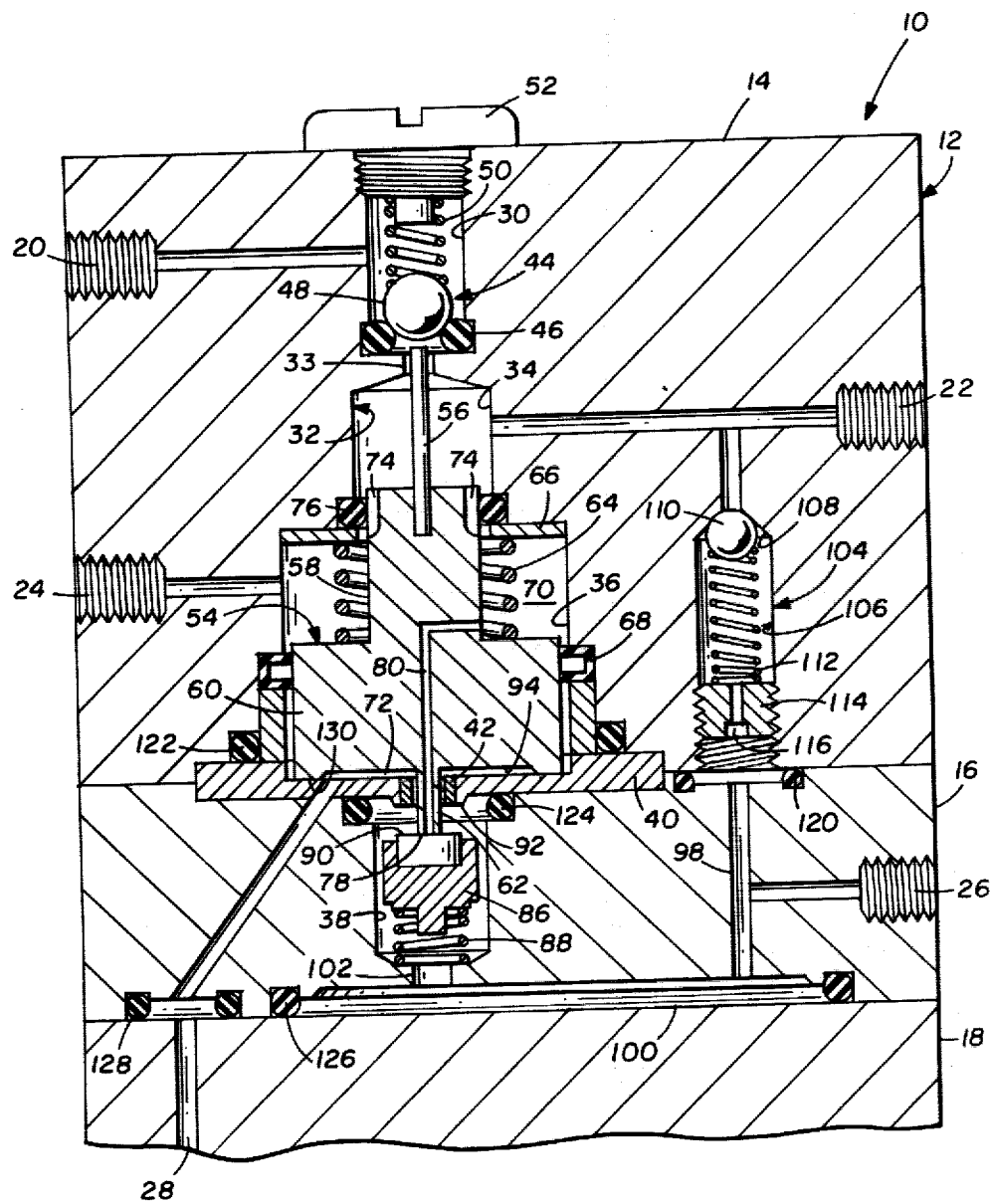
FIG. 1 is a cross sectional view of a valve in accordance with the present invention and illustrating the ball valve in the closed or deactivated position.
Figure 2:
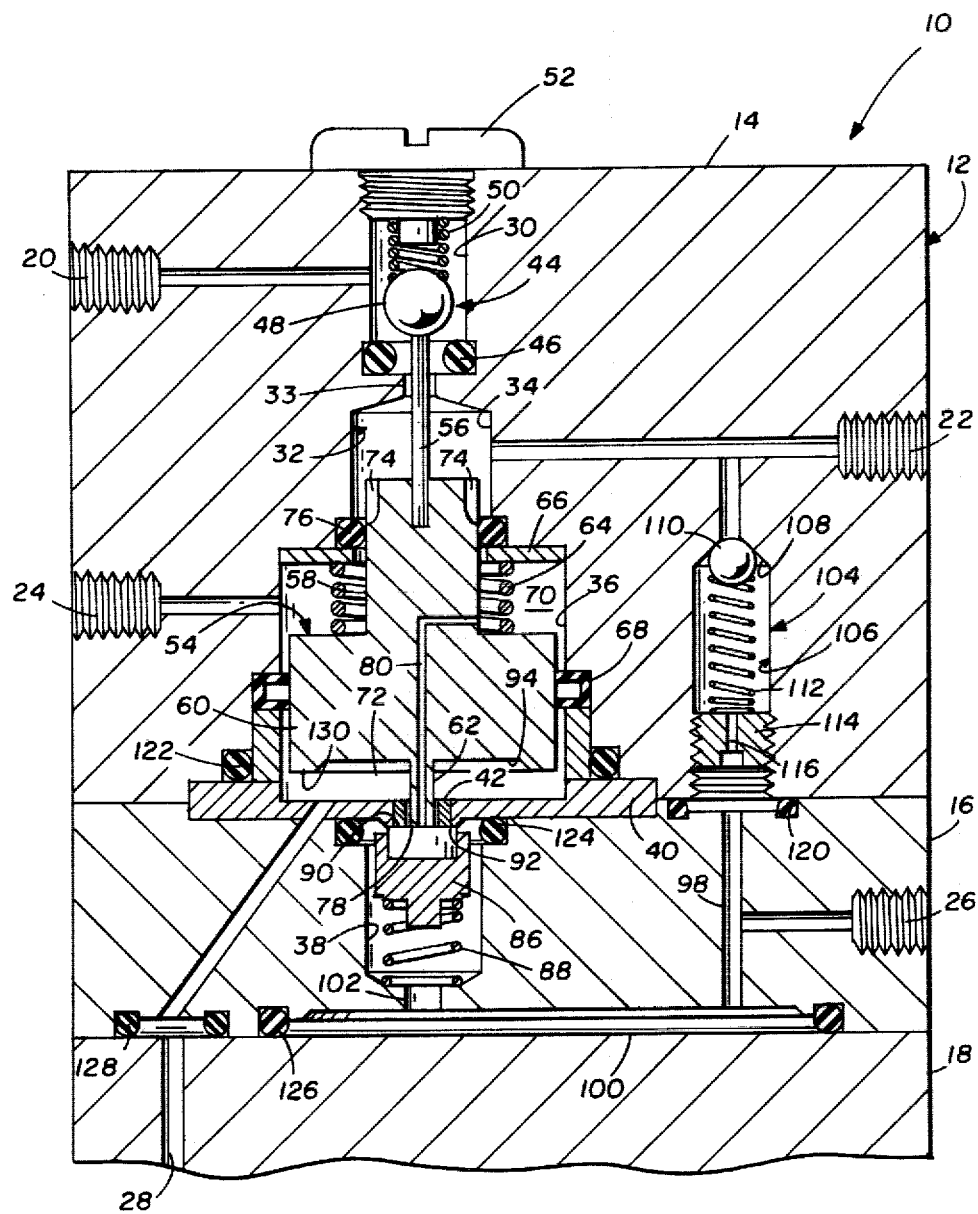
FIG. 2 is a cross sectional view of the valve of FIG. 1 illustrating the ball valve in the opened or activated position permitting flow from the inlet port to the outlet port.

Referring now to the Drawings, wherein like reference characters designate like or corresponding parts throughout several views, FIGS. 1 and 2 illustrate a valve 10 forming one embodiment of the present invention.

The valve 10 includes a valve body 12 which consists of a valve section 14, regulator section 16 and control section 18. Each of the sections 14, 16 and 18 may be secured in abutting relationship by any conventional technique.

The valve section 14 of the valve body 12 includes an inlet port 20, outlet port 22, and exhaust port 24. Within regulator section 16 of the valve body 12 there is is formed a reset port 26. Each of the ports 22, 24, and 26 enables the interconnection of the valve body 12 to devices outside the valve 10 and may have a threaded portion as shown to receive an external connector. A control port 28 is formed within control section 18 and by means of a passage is in communication with the regulator section 16. The control port 28 connects to a control device, such as a block and bleed valve, as will be discussed in detail hereinafter.

A ball valve chamber 30 and a piston chamber 32 are formed within the valve section 14. The chambers 30 and 32 are preferably formed with a circular horizontal cross section and are interconnected by a narrow passageway 33. The piston chamber 32 is further divided into an upper piston chamber 34 and a lower piston chamber 36. As can be seen in FIGS. 1 and 2, the horizontal cross section of upper piston chamber 34 is smaller than that of lower piston chamber 36. A regulator chamber 38 is formed within the regulator section 16. Regulator chamber 38 is separated from the piston chamber 32 by a divider plate 40 having a small annular opening defined by annulus 42.

A ball valve 44 is positioned within ball valve chamber 30. Ball valve 44 is a bi-stable valve, essentially having only two possible positions, open and activated or closed and deactivated. The ball valve 44 includes an O-ring seal 46 and a ball 48 for sealing engagement therewith. A spring 50 acts between a threaded cap 52 and a ball 48 to urge the ball into sealing engagement with the O-ring seal 46. The threaded cap 52 provides for assembly or removal of the components of the ball valve 44.

An activating piston 54 is positioned within the piston chamber 32 for movement along a vertical axis within the chamber between first and second positions in the chamber. The piston 54 includes an extension rod 56, an upper section 58, a lower section 60 and an extension tube 62. The piston 54 is biased downwardly toward the divider plate 40 by a spring 64. The biasing force is settable by adjusting the thickness of a shim 66. When the activating piston is moved upward as shown in FIG. 2, the extension rod activates the ball valve 44 to interconnect the inlet port 20 and the outlet port 22.

A chamber seal 68, having a U-shape in cross section, is positioned within lower piston chamber 36 for sealing engagement between the walls of the chamber and the lower section 60 of piston 54. The chamber seal 68 acts to divide lower piston chamber 36 into two compartments 70 and 72, between which fluid flow is restricted. The exhaust port 24 communicates with the compartment 70 as shown in FIGS. 1 and 2.

When activating piston 54 is positioned as shown in FIG. 1, the ball valve 44 is deactivated and the outlet port 22 is interconnected to exhaust port 24 through a series of grooves 74 formed around the outer circumference of upper section 58 of the piston 54. When the ball valve 44 is activated by the movement of piston 54 upward as shown in FIG. 2, flow between outlet port 22 and exhaust port 24 is prevented by means of an O-ring seal 76 in sealing relationship with the upper section 58 of activating piston 54 and the walls of upper piston chamber 34.

The extension tube 62 on the activating piston 54 has a generally uniform outer diameter for cooperating with the annulus 42 to control fluid flow between the regulator chamber 38 and the compartment 72. The exposed end 78 of extension tube 62 lies on a plane generally perpendicular to the direction of motion of the piston 54 within chamber 32. A pressure relief passage 80 is provided within the activating piston 54 and is centered to be aligned with an opening at end 78 of the extension tube 62. The opposite end of the passage 80 opens into compartment 70.

A regulator piston 86 is positioned within regulator chamber 38 for movement between first and second positions between the ends of the chamber. A spring 88 biases the regulator piston 86 upward as shown in FIGS. 1 and 2. The upper surface of the regulator piston 86 is provided with a sealing surface 90. The sealing surface 90 is normally positioned in sealing engagement with the end 78 of extension tube 62 to prevent flow of fluid from compartment 72 through the passage 80. In addition, the sealing surface 90 is in sealing engagement with surface 92 on divider plate 40 when the regulator piston 86 is positioned as shown in FIG. 2 to prevent fluid flow in the passage formed by the annulus 42 and extension tube 62.

The control port 28 also communicates with compartment 72 proximate the annulus 42. The lower section 60 of activating piston 44 includes a recessed surface 94 to insure positive communication between the control port 28 and the passage between extension tube 62 and annulus 42.

The reset port 26 communicates with the regulator chamber 38 through passages 98, 100 and 102.

A bypass valve 104 is positioned within the valve body 12 between the outlet port 22 and reset port 26. The bypass valve includes a chamber 106 formed within the valve body 12 and having a conical sealing face 108 at one end thereof. A ball 110 is urged into sealing engagement with the sealing face 108 by means of spring 112. An adjusting screw 114 is threadedly engaged with a portion of chamber 106 to adjust the force exerted by the spring 112 and has a passage 116 therein. By adjusting the force exerted by spring 112, the bypass valve 104 will remain closed until a predetermined pressure differential exists between the fluid pressure at outlet port 22 and reset port 26.

The valve section 14, regulator section 16 and control section 18 of the valve body 12 are provided with O-ring seals 120, 122, 124, 126 and 128 to prevent fluid communication between various components of the valve 10.

In operation, the valve 10 is typically connected to a source of pressurized fluid at inlet port 20. A downstream device, such as a valve actuator, is connected to the outlet port 22 of valve 10. The control port 28 is connected to a control device for monitoring the fluid pressure at the outlet port 22 or other system variable. The control device blocks fluid flow through control port 28 until a preset variable limit is achieved. This preset limit may be either a maximum pressure, a minimum pressure or the control device may be equipped to sense both maximum and minimum pressures and will prevent fluid flow through control port 28 only within a predetermined range of a system variable.

One such control device is disclosed in U.S. Pat. No. 4,173,150 issued Nov. 6, 1979 to Tommy L. Gray, which disclosure is herein incorporated by reference. The monitoring or control device disclosed in this patent employs block and bleed valves which block the flow of a relatively low regulated control pressure fluid until a preset pressure limit is achieved, whereupon the valve is opened to permit fluid flow therethrough. Block and bleed valves interconnected with control port 28 may also be solenoid operated, for example, in a time controller. The valve 10 controls the downstream pressure from outlet port 22 as a function of the pressure and fluid flow through control port 28 in a manner described hereinafter.

To initially activate ball valve 44, in either the manual mode or automatic mode, pressurized fluid is introduced into reset port 26 when the activating piston 54 is positioned as shown in FIG. 1. The pressurized fluid flows through passages 98, 100 and 102 into regulator chamber 38. A controlled fluid flow is established in the passage between the annulus 42 and extension tube 62 into compartment 72. The pressurized fluid in compartment 72 acts against recessed surface 94 and surface 130 on piston 54. When the force exerted by the fluid pressure against surfaces 94 and 130 exceeds the pre-loaded spring force of spring 64, the piston 54 will begin movement upward within the piston chamber 32. As the piston 54 moves upward, the extension rod 56 will contact ball 48 and move it out of engagement with O-ring seal 46 as shown in FIG. 2. This activates ball valve 44 and permits communication between inlet port 20 and outlet port 22 to pressurize the downstream line. When the ball valve 44 has been activated, the reset port 26 may be closed or blocked from external influences and a predetermined pressure will be maintained within the reset port 26 by the bypass valve 104.

The valve 10 permits the fluid pressure within compartment 72 acting on surfaces 94 and 130 to be maintained at a pressure level substantially below that of the reset fluid pressure applied to the reset port 26. When pressurized fluid is introduced into reset port 26, as explained above, the annulus 42 and extension tube 62 cooperate to inhibit the flow of fluid into compartment 72. As the pressure within the compartment 72 increases, the activating piston 54 and regulator piston 86 move upwardly until the sealing surface 90 on regulator piston 86 moves into sealing engagement with surface 92 of the divider plate 40. In this manner, the pressure within the compartment 72 is controlled to a predetermined limit determined by the force exerted by springs 64 and 88. Should the pressure within compartment 72 increase above this predetermined limit for any reason, the piston 54 will move upward while movement of regulator piston 86 is blocked by the divider plate 40. The end 78 of extension tube 62 will then move out of sealing engagement with sealing surface 90 and pressurized fluid within the compartment 72 will flow through pressure relief passage 80 and out the exhaust port 24 to reduce the pressure within the compartment to the predetermined limit.

In one operating embodiment of the present invention, the pressure within compartment 72 is maintained below 15 psi while the fluid pressure within reset port 26 is approximately 100 psi.

When the control device, such as a block and bleed valve, connected to control port 28 senses a condition which requires a decrease in downstream fluid pressure, a fluid flow is established through control port 28, thereby decreasing the fluid pressure within compartment 72. The force exerted by spring 64 forces the activating piston 54 downward, deactivating ball valve 44. When activating piston 54 moves into the position shown in FIG. 1, the fluid pressure in outlet port 22 is exhausted through grooves 74 into exhaust port 24 to reduce the downstream pressure.

When flow is permitted through control port 28, the sealing surface 90 and surface 92 will move out of sealing engagement, thereby permitting flow of pressurized fluid through annulus 42 and into compartment 72. However, the flow through annulus 42 is maintained at a controlled level so that the flow through control port 28 exceeds this flow and the activating piston 54 continues to move downward.

In the manual reset mode, the valve 10 is reset to activate ball valve 44 by manually providing pressurized fluid at reset port 26. The valve 10 may be operated in an automatic reset mode by interconnecting the inlet port 20 with the reset port 26. The operation of valve 10 in the automatic reset mode is identical to the operation in the manual reset mode as described above. Even though pressurized fluid is continuously applied to the reset port 26 in the automatic reset mode, the amount of flow between annulus 42 and extension tube 62 is designed to be insufficient to cause a build-up of pressure within the compartment 72 so long as flow is permitted through the control port 28 by the control device. However, as soon as the fluid flow within the control port 28 is blocked by the control device, the fluid pressure will again be built up in the compartment 72, causing the activating piston 54 to move upward and activate the ball valve 44.

An advantage of the invention as embodied herein is that valve 10 is controlled by a relatively low pressure fluid within the compartment 72 although the fluid pressure within reset port 26 may be relatively high. Another advantage of valve 10 is that it allows the control of a relatively high inlet port pressure by a relatively low pressure which may be used in a block and bleed valve. Still another feature of the present invention as embodied by valve 10 is the self cleaning operation of the passage between annulus 42 and extension tube 62 by the high velocity fluid flow therethrough which maintains the operation of the valve 10 in a consistent and predictable manner.

Although only a single embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

I claim:

1. A valve comprising:

a valve body having a valve chamber, a piston chamber and a regulator chamber therein, said valve body further defining an inlet port communicating with the valve chamber, an outlet port, an exhaust port and control port communicating with the piston chamber and a reset port communicating with the regulator chamber;

an activating piston positioned within the piston chamber and moveable therein between first and second positions between ends of the piston chamber, said activating piston defining a first surface thereon for exposure to a pressurized fluid for urging said activating piston into the second position in the piston chamber, said activating piston further having grooves therein for interconnecting the outlet and the exhaust ports when said activating piston is in the first position in the piston chamber;

a bi-stable valve positioned in the valve chamber to interconnect the inlet and outlet ports when activated, said activating piston activating said bi-stable valve when said activating piston is in the second position in the piston chamber;

a first spring biasing said activating piston towards the first position in the piston chamber;

an annulus interconnecting the piston chamber and the regulator chamber, said activating piston further having an extension tube thereon cooperating with said annulus to restrict flow of a pressurized fluid into the piston chamber from the regulator chamber to act on the first surface of said activating piston, the pressurized fluid entering the regulator chamber through the reset port;

a regulator piston positioned within the regulator chamber and moveable therein between first and second positions between ends of the regulator chamber, said regulator piston defining a seal surface thereon for sealing engagement with an exposed end of the extension tube;

said activating piston further defining a pressure relief passage therein extending from the exposed end of the extension tube to interconnect with the exhaust port, the seal surface further engageable with said valve body in sealing engagement to prevent flow of pressurized fluid between the regulator chamber and the piston chamber when said regulator piston is in the second position in the regulator chamber to limit the pressure of the pressurized fluid acting on the first surface;

a second spring biasing said regulator piston towards the second position in the regulator chamber; and said activating piston being urged toward the second position in the piston chamber to activate said bi-stable valve when the fluid flow into the piston chamber acting on the first surface exceeds the flow out of the piston chamber through the control port.

2. The valve of claim 1 wherein said valve body further comprises a bypass valve interconnecting the outlet port and the reset port to maintain a predetermined pressure in the regulator chamber so that said bi-stable valve remains activated when the reset port is blocked from a source of pressurized fluid external of said valve.

3. The valve of claim 1 wherein the reset port is interconnected to the inlet port so that the pressure within the regulator chamber is maintained at the pressure in the inlet port.

4. A valve comprising:

a valve body having a ball valve chamber, a piston chamber and a regulator chamber therein, said valve body further defining an inlet port communicating with the ball valve chamber, an outlet port, exhaust port and a control port communicating with the piston chamber and a reset port communicating with the regulator chamber, the reset port being interconnected to a source of pressurized fluid external of said valve;

an activating piston positioned within the piston chamber and moveable therein between first and second positions between ends of the piston chamber, said activating piston defining a first surface thereon for exposure to a fluid for urging said activating piston into the second position in the piston chamber, said activating piston further having grooves therein for interconnecting the outlet and the exhaust ports when said activating piston is in the first position in the piston chamber;

a ball valve positioned in the ball valve chamber to interconnect the inlet and outlet ports when activated, said activating piston having an extension rod for activating said ball valve when said activating piston is in the second position in the piston chamber;

a first spring biasing said activating piston toward the first position in the piston chamber;

an annulus interconnecting the piston chamber and the regulator chamber, said activating piston further having an extension tube thereon cooperating with said annulus to restrict fluid flow between the regulator chamber and the piston chamber, the fluid flow into the piston chamber acting against the first surface to move said activating piston into the second position in the piston chamber when the fluid flow into the piston chamber through the passage between said annulus and the extension tube is greater than the fluid flow from the piston chamber through the control port;

a regulator piston positioned within the regulator chamber and moveable therein between first and second positions between ends of the regulator chamber, said regulator piston defining a seal surface thereon for sealing engagement with an exposed end of the extension tube;

said activating piston further including a pressure relief passage therein extending from the exposed end of the extension tube to interconnect with the exhaust port;

the seal surface further being engageable with said valve body for sealing engagement to restrict fluid flow between the regulator and piston chambers when said regulator piston is in the second position in the regulator chamber to limit the fluid pressure acting on the first surface of said activating piston to a predetermined limit, the exposed end of the extension tube moving out of sealing engagement with the seal surface to permit fluid flow to the exhaust port to reduce the pressure acting on the first surface if the pressure exceeds the predetermined limit; and a second spring biasing said regulator piston towards the second position in the regulator chamber.

5. The valve of claim 4 wherein said valve body further comprises a bypass valve interconnecting the outlet port and the regulator chamber to maintain a predetermined pressure in the regulator chamber so that said ball valve remains activated when the reset port is blocked from the external source of pressurized fluid.

6. The valve of claim 4 wherein the reset port and the inlet port are interconnected to maintain a predetermined pressure in the regulator chamber so that said ball valve may be automatically reactivated when fluid flow through the control port is blocked.

7. A valve comprising:

a valve body having a piston chamber therein and defining an inlet port, an outlet port, an exhaust port and a control port, each of said ports communicating with the piston chamber, said valve body further having a regulator chamber;

an annulus interconnecting the piston and regulator chambers;

an activating piston positioned within the piston chamber and movable therein between first and second positions, said activating piston including a pressure relief port and defining a first surface thereon toward the regulating chamber;

valve means positioned within said valve body and activated by movement of said activating piston into the second position to interconnect said inlet and outlet ports;

a regulator piston positioned within the regulator chamber and movable therein between first and second positions, the regulator piston defining a seal surface thereon for sealing engagement with said valve body to control fluid flow between the regulator and piston chambers when the regulator piston is in the second position in the regulator chamber;

means responsive to the movement of said activating piston and extending through said annulus to said regulator piston to limit the fluid pressure on the first surface of the activating piston by establishing a communication with the exhaust port; and the control port communicating with the piston chamber to control fluid introduced through the regulator chamber and the annulus acting on the first surface to control the movement of said activating piston into the first position to deactivate said valve means.

8. The valve of claim 7 further comprising spring means biasing said activating piston into the first position.

9. A valve comprising:

a valve body having a piston chamber therein and defining an inlet port, an outlet port, an exhaust port and a control port, each of said ports communicating with the piston chamber, the valve body further including a regulator chamber;

an annulus interconnecting the piston and regulator chambers;

an activating piston positioned within the piston chamber and movable therein between first and second positions, said activating piston defining the first surface thereon;

spring means biasing said activating piston into said first position;

valve means positioned within said valve body and activated by movement of said activating piston into the second position to interconnect said inlet and outlet ports;

a regulator piston positioned within the regulator chamber and movable therein between first and second positions;

spring means biasing said regulator piston toward the second position in the regulator chamber;

said regulator piston defining a seal surface thereon for sealing engagement with said valve body to control the flow of fluid between the regulator and piston chambers when said regulator piston is in the second position in the regulator chamber;

said activating piston further having an extension tube formed thereon extending through said annulus to an end surface for sealing engagement with the sealed surface of said regulator piston, said activating piston having a pressure relief port formed therein extending from and opening in the end surface to interconnect with the exhaust port so that the force exerted on said activating piston by the fluid in the piston chamber acting on the first surface is limited; and the control port communicating with the piston chamber to control fluid introduced through the regulator chamber and the annulus and acting on the first surface of said activating piston so that said piston moves into the first position to deactivate said valve means.

10. The valve of claim 8 or 9 wherein said activating piston further has grooves formed therein for interconnecting said outlet port and said exhaust port when said activating piston in in the first position.

11. The valve of claim 9 wherein said valve body further defines a reset port communicating with the regulator chamber for introducing fluid under pressure into the regulator chamber to permit activation of said valve means.

12. The valve of claim 11 further comprising bypass valve means interconnecting the outlet port and the regulator chamber to maintain a predetermined pressure in the regulator chamber so that said valve means may remain activated.

* * * * *